United States Patent
Roca et al.

(10) Patent No.: US 9,192,183 B2
(45) Date of Patent: Nov. 24, 2015

(54) CARMINE FOOD COLORING COMPOSITION WITH HIGH STABILITY

(75) Inventors: Elisabeth Roca, Montpellier (FR); Patrick Lemonnier, Mauguio (FR); Regis Roubille, Isle sur la Sorgue (FR)

(73) Assignee: Chr. Hansen Natural Colors A/S, Hoersholm (DK)

( * ) Notice: Subject to any disclaimer, the term of this patent is extended or adjusted under 35 U.S.C. 154(b) by 91 days.

(21) Appl. No.: 14/008,424

(22) PCT Filed: Mar. 30, 2012

(86) PCT No.: PCT/EP2012/055849
§ 371 (c)(1),
(2), (4) Date: Sep. 27, 2013

(87) PCT Pub. No.: WO2012/131057
PCT Pub. Date: Oct. 4, 2012

(65) Prior Publication Data
US 2014/0017366 A1    Jan. 16, 2014

(30) Foreign Application Priority Data
Mar. 30, 2011 (EP) .................................. 11160330

(51) Int. Cl.
*A23L 1/27* (2006.01)
*A23L 1/275* (2006.01)
*C09B 63/00* (2006.01)
*C09B 61/00* (2006.01)

(52) U.S. Cl.
CPC .............. *A23L 1/2751* (2013.01); *C09B 61/00* (2013.01); *C09B 63/005* (2013.01)

(58) Field of Classification Search
CPC .......... A23L 1/27; A23L 1/2751; C09B 61/00; C09B 63/005; C09B 67/0034
USPC .......................................... 426/250, 262, 268
See application file for complete search history.

(56) References Cited

U.S. PATENT DOCUMENTS

| 5,147,673 A | 9/1992 | Schul |
| 5,164,212 A | 11/1992 | Nafisi-Novaghar et al. |
| 2006/0118000 A1* | 6/2006 | Isager et al. .................. 106/401 |

FOREIGN PATENT DOCUMENTS

| CN | 1 318 178 | 6/2003 |
| EP | 0 200 043 | 11/1986 |
| EP | 1 666 539 | 6/2006 |
| EP | 1 669 414 | 6/2006 |
| WO | WO-2006/056585 | 6/2006 |

OTHER PUBLICATIONS

First Office Action dated Oct. 10, 2014 issued in Chinese Application No. 201280016763.4, with English translation.

* cited by examiner

*Primary Examiner* — Helen F Heggestad
(74) *Attorney, Agent, or Firm* — Foley & Lardner LLP

(57) ABSTRACT

The present invention relates to a carmine food coloring composition with high stability towards acidity and heat and its uses for coloring foodstuffs, such as fruit preparations and dairy products. The carmine food coloring composition comprises a dispersion of carmine lake blended with a solution of dissolved carmine lake.
The present invention further relates to a method for preparing the carmine food coloring composition and uses of such carmine food coloring composition.

15 Claims, 1 Drawing Sheet
(1 of 1 Drawing Sheet(s) Filed in Color)

Standard carmine (1)

Improved carmine formulation (2)

Not heat treated fruit preparation

Heat treated fruit preparation 90°C 5 min

CARMINE FOOD COLORING COMPOSITION WITH HIGH STABILITY

CROSS-REFERENCE TO RELATED APPLICATIONS

This application is a national phase of International Application PCT/EP2012/055849, filed Mar. 30, 2012, which was published on Oct. 4, 2012, as WO 2012/131057, which claims the benefit of EP Application No. 11160330.4, filed Mar. 30, 2011. The respective contents of each of these applications are incorporated here by reference in their entirety.

FIELD OF THE INVENTION

The present invention relates to a carmine food coloring composition with high stability towards acidity and heat and its uses for coloring foodstuffs, such as fruit preparations. The carmine food coloring composition comprises a dispersion of carmine lake blended with a solution of dissolved carmine lake.

The present invention further relates to a method for preparing the carmine food coloring composition and uses of such carmine food coloring composition.

BACKGROUND OF THE INVENTION

Carmine is one of the most commonly used colors for fruit preparations and dairy applications. It represents 40% of the color market for fruit preparations. Carmine color is commonly used to color e.g. strawberry yoghurt. It is added to the fruit preparation during the pasteurization treatment (heat treatment with a minimum temperature of 85° C.) to 1) strengthen the color of the yoghurt when containing this fruit preparation and 2) to standardize the batch-to-batch color of the yoghurt and to avoid variations in color due to fruit quality or origin of the fruit preparation.

Carminic acid is a colorant which can be extracted from the female insect bodies of *Dactylopius coccus costa* (alternative name *Coccus cacti* L.). Carminic acid is harvested by extraction from the dried bodies of said insects with water or alcohol. The insects live on *Nopalea coccinellifera, Opuntia fidus indica* and other plants of the family Cactaceae cultivated for instance in the desert areas of Mexico and Central and South America. Depending on the pH the colorant may be a color in a spectrum from orange over red to purple and is generally known as cochineal or cochineal color. Carmine colorant is widely used in foods and beverages.

A "carminic acid lake" denotes herein a type of coloring composition consisting essentially of carminic acid combined more or less definitely with aluminum and/or calcium. The lake is prepared by reacting carminic acid with aluminum and/or calcium under aqueous conditions. The conditions are adjusted in a way that favors precipitation of the aluminum/calcium-carminic acid lake complex composition. This complex composition is termed carmine.

A description for preparing a carmine lake can be found in International patent (PCT) application WO2006/056585.

Carmine colors for fruit preparations are made of dissolved carmine lake in alkaline solution. These solutions are well soluble in fruit preparation bases, they give a bright intense pink shade and have the ability to color fruit pieces, which is an important quality factor for the fruit preparation producers.

However, these carmine solutions are heat sensitive when added in acidic media such as fruit preparations. This results in losses of 20% to 40% of the color during the heat process and variations of color from batch to batch of production if the temperature is not controlled well (in particular the cooling down).

Some solutions exist in the market. They consist mainly on dispersions of carmine lake. Dispersions of carmine lake are less sensitive to the media. However, they do not provide as bright and intense a color as carmine solutions and they do not color the fruit pieces.

Other solutions in the market are red acid stable carminic acid (ammonium carminate). This molecule has not been described in the EU regulation for colors or in the JECFA (Joint FAO/WHO Expert Committee on Food Additives). Moreover, color solutions with ammonium carminate do not provide the capability to color fruit pieces.

Thus, there exists a need in the industry for an improved carmine food coloring composition for coloring foodstuff, such as fruit preparations, which is heat and acid stable and which provide a bright intense color.

SUMMARY OF THE INVENTION

The aim of the present invention is to provide a pigment composition using carmine as pigment for coloring of foodstuff, such as fruit preparations, which has a higher stability towards acidity and heat and which is capable of coloring fruit pieces with an intense shade.

The solution is based on creating a carmine food coloring composition containing both dispersed carmine lake and dissolved carmine in alkaline solution in an optimized ratio.

As can be seen in the Examples herein, this solution was found to provide a surprisingly better heat and acid stability, a bright shade comparable to the standard carmines of the market and a very good coloration of fruit pieces.

A first aspect of the present invention, thus, relates to a carmine food coloring composition for coloring of foodstuff, such as fruit preparations, comprising a dispersion of carmine lake mixed with a solution of carmine lake in a ratio of from about 5:95 to about 50:50, such as from about 15:85 to about 40:60, such as from about 20:80 to about 30:70.

A second aspect of the present invention relates to a method for preparation of a carmine food coloring composition according to the first aspect, comprising:
a) providing a carmine lake,
b) preparing a dispersion of carmine lake with a pH below about 10.6,
c) preparing a solution of dissolved carmine lake with a pH below about 10.6, and
d) blending the dispersion of carmine lake with the alkaline solution of dissolved carmine lake in a ratio of from about 5:95 to about 50:50.

Step c) comprises dissolving the carmine lake at a pH above about 10.8, adding an excipient and adjusting the pH to below about 10.6.

A third aspect of the present invention is directed to use of the carmine food coloring composition according to the first aspect of the invention for coloring a foodstuff, such as a fruit preparation.

BRIEF DESCRIPTION OF THE DRAWINGS

This application file contains at least one drawing executed in color. Copies of this patent or patent application publication with color drawing(s) will be provided by the Office upon request and payment of the requisite fee.

DETAILED DESCRIPTION OF THE INVENTION

Definitions

The term "fruit preparation" refers to a fruit transformation by cutting added pectin and starch for stabilization. Fruit preparations can be added to dairy products, such as yoghurts. Fruit preparations can be with or without fruit pieces.

The terms "carmine dispersion" or "dispersion of carmine lake" herein refer to a system in which carmine lake particles are dispersed in a continuous phase of a different composition.

The terms "carmine solution" or "solution of carmine lake" herein refer to a system in which carmine lake is dissolved in a continuous phase of a different composition.

The term "pigment" relates to a material that changes the color of light it reflects as the result of selective color absorption. This physical process differs from fluorescence, phosphorescence, and other forms of luminescence, in which the material itself emits light.

The term "excipient" as used herein means any inert substance such as a powder or liquid, that forms a vehicle for an active substance, such as, for example, a pigment. Other excipients may include any known substance to modulate or modify the technological properties of powder such as for example, diluents, agglutinants, binders, lubrifiers or disintegrants, carriers, stabilizers, permeation enhancers etc.

As used herein, the term "excipient" means food-grade and pharmaceutically acceptable excipients that are non-toxic to the cell or mammal being exposed thereto at the dosages and concentrations employed.

Implementation and Aspects of the Invention

The process for preparing carmine food coloring compositions with dissolved carmine lake comprises three steps:

First, the pigment is extracted from cochineal insects. The extracted component is called carminic acid. The carminic acid is an anthraquinone, soluble in water, with the ability to react with cations to form chelates.

Second, carminic acid is chelated with aluminum and/or calcium salts. The resulting component is called a carmine lake. It is insoluble in water and in diluted acid. It is slightly soluble in alcohol and oil. It is soluble in diluted alkali. It is highly stable to heat and light in the optimal range of pH (6-12).

Third, the carmine lake is dissolved in alkaline media (pH>10.8). The resulting solution is the water soluble carmine solution used in the fruit preparations industry.

Water soluble carmine solutions are sensitive to acidity. In acidic condition, the carmine solution precipitates giving insoluble red spots. The precipitation is reversible; increasing the pH to above 7 allows for a re-solubilization of the red spots.

Figure 1:
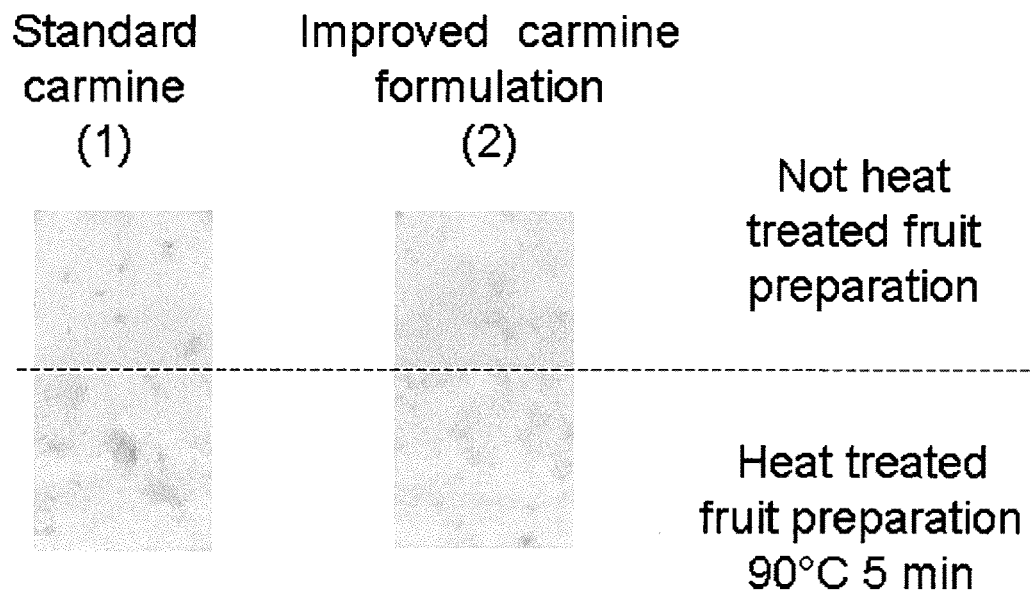
FIG. 1 depicts a fruit preparation colored with standard carmine reference (CA 4 LWK) before and after heat treatment for 5 min. at 90° C.

As water soluble carmine solutions are sensitive to acidity, a loss of color is observed after a standard heat treatment of 5 minutes at 90° C. of fruit preparations colored with a standard carmine reference (CA 4 LWK: Carmine alkaline solution at 4% dosage made from carmine lake 60% in water and added KOH 97% to pH 10.8-12). FIG. 1 and Table 1 illustrate this change of shade.

TABLE 1

Spectrocolorimetric values for fruit preparation colored with standard carmine reference (CA 4 LWK) before and after pasteurization.

| Sample | Dosages | Carminic acid ppm | Pasteurization | L | C | h |
|---|---|---|---|---|---|---|
| CA 4 LWK | 0.0675% | 27 ppm | Before | 74.29 | 17.83 | 8.44 |
| | | | After | 76.21 | 13.78 | 22.09 |

L increases: the color is less intense.
C decreases: the color is less bright.
h increases: the color changes from blue-pink to orange-pink.

When measured in a tristimulus system, e.g. a Minolta 310 apparatus, saturation is expressed by the parameter "chroma" or C, hue is expressed in degrees by the parameter h and lightness is expressed by the parameter L. Accordingly, a color may be characterized by its chroma value reflecting the "coloring strength" or "coloring power" of the substance.

The precipitation of water soluble carmine in acidic conditions is responsible for the coloration of the fruit pieces. The pH of fruit preparations is about 3.6 to 4. The water soluble carmine enters into the fruit pieces, inside the cells, and precipitates. Without wishing to be bound by theory it is thought that the precipitates are not able to leave the fruit pieces due to their size. Thus, the color is trapped inside the cells, giving a colorful aspect to the fruit pieces.

To prepare a dispersion of carmine, the carmine lake is dispersed into a solution at pH<10.6.

As mentioned above, dispersions of carmine lake are less sensitive to acidity and heat treatment. However, the color is less intense than that of carmine solutions and dispersions of carmine lake does not provide coloration of fruit pieces.

The present invention aims to combine both properties of water soluble carmine and carmine lake.

The ratio between the carmine dispersion and the carmine solution may vary and is influenced by the quality of the phase of carmine dispersion. The quality of the dispersed phase depends on:
  The type of carmine lake used:
    the shade
    the particle size of the carmine lake. The thinner the carmine lake (low particle size) the brighter the dispersed phase and the carmine blend would be.
  The process used to disperse the carmine lake when producing the dispersed phase. Silverson® equipment can allow the dispersion of the carmine lake into smaller agglomerates. The thinner the agglomerates are the brighter the dispersed phase and the carmine blend would be.

Thus, one aspect of the present invention relates to a carmine food coloring composition for coloring foodstuff, comprising a dispersion of carmine lake mixed with a solution of carmine lake. The ratio of the dispersion of carmine lake to the solution of carmine lake is between about 5:95 to about 50:50.

In one preferred embodiment of the invention the ratio is from about 15:85 to about 40:60. In a more preferred embodiment of the invention the ratio is from about 20:80 to about 30:70.

Example 1 herein describes a method for preparing carmine food coloring compositions according to the present invention. A skilled person will from the teachings of Example 1 herein be readily able to prepare carmine food coloring compositions with different ratios of dispersion of carmine lake to solution of carmine lake and thereby determine the ratio of any carmine food coloring composition.

Example 5 herein describes an alternative and simpler method for determining the ratio of the dispersion of carmine lake to the solution of carmine lake by measuring first the dosage of carminic acid in the blend and then determining the turbidity of the blend with a nephelometer. It is within the ability of the skilled person to calibrate the nephelometer and carry out the necessary measurements and based on Example 5 determine the ratio of dispersion of carmine lake to the solution of carmine lake.

In a preferred embodiment of the present invention the foodstuff is a fruit preparation.

In a preferred embodiment of the present invention the carmine food coloring composition comprises an excipient. The excipient works to reduce water activity, reduce sedimentation by increasing viscosity and avoid microbiological proliferation.

Examples of excipients include glycerin, maltodextrin syrup and propylene glycol.

In a preferred embodiment of the present invention the excipient is propylene glycol.

The excipient may be present in the carmine food coloring composition in an amount of from 1% (w/w) to 80% (w/w), such as from 10% (w/w) to 60% (w/w), such as from 30% (w/w) to 50% (w/w).

The colored fruit preparation can be used together with a dairy product, such as yoghurt. In one embodiment the colored fruit preparation is not mixed with the dairy product. In another embodiment the colored fruit preparation is mixed with the dairy product to provide coloration of the resulting mixed product.

In one embodiment of the present invention the carmine pigment content of the carmine food coloring composition is at least 13% (w/w), such as at least 14% (w/w), such as at least 15% (w/w).

Another aspect of the present invention relates to a method for preparing a carmine food coloring composition according to the first aspect of the invention.

A carmine lake may e.g. be provided according to the description of International patent application WO2006/056585.

The minimum pH for solubility of the carmine lake is 10.6, i.e. 50% of the carmine is in solution and 50% of the carmine is in dispersion at pH about 10.6.

The skilled person will know of ways of preparing a dispersion and a solution, respectively, of carmine lake.

A dispersion of carmine lake can be prepared by mixing carmine lake in a suitable solvent, such as water with an excipient, such as propylene glycol, at pH<<10.6, such as between 9.2 and 9.5, or such as between 9.2 and 9.8 as exemplified herein.

A solution of carmine lake can be made by dissolving carmine lake in aqueous solution with pH>>10.6, such as a pH between about 10.8 to 11.1, such as at a pH of about 11. After addition of excipient, such as propylene glycol, the pH is adjusted to pH<9.9, such as between about 9.2 and about 9.8, to allow a final blending with the dispersion of carmine lake. The addition of excipient allows for the pH to be lowered below 10.6 while maintaining a solution of carmine lake.

Thus a preferred embodiment is a method for preparation of a carmine food coloring composition comprising the steps:
 a) providing a carmine lake,
 b) preparing a dispersion of carmine lake in an aqueous solution at pH<10.6, such as 9.2<pH<9.8,
 c) preparing an alkaline solution of dissolved carmine lake in aqueous solution with pH>10.6, adding an excipient and slowly adjusting the pH to 9.2<pH<9.9, and
 d) blending the dispersion of carmine lake with the alkaline solution of dissolved carmine lake in a ratio of from about 5:95 to about 50:50 dispersed pigment to dissolved pigment.

The dispersion of carmine lake is blended with the alkaline solution of carmine lake in a ratio of from about 5:95 to about 50:50.

In a preferred embodiment step b) involves preparing a dispersion of carmine lake in aqueous solution at pH 9.2<pH<9.8.

In an even more preferred embodiment step b) involves preparing a dispersion of carmine lake in aqueous solution at pH 9.2<pH<9.5.

The pH and the viscosity of the solution allows for a good stability and repartition of each phase and a high pigment content in the carmine composition.

In one preferred embodiment of the invention the ratio is from about 15:85 to about 40:60. In a more preferred embodiment of the invention the ratio is from about 20:80 to about 30:70.

Yet another aspect of the present invention is directed to a carmine food coloring composition obtainable by the method according to the previous aspect of the present invention.

The final aspect relates to use of a carmine food coloring composition for coloring a foodstuff.

In a preferred embodiment the foodstuff is a fruit preparation.

In another preferred embodiment the foodstuff is a dairy product.

Embodiments of the present invention are described below, by way of non-limiting examples.

EXAMPLES

Example 1

Preparation of Carmine Blend

Materials:
Carmine lake 60% (prepared according to International Patent (PCT) Application no. WO2006/056585)
 Sodium hydroxide 97%
 Propylene Glycol
 Demineralised or tap water
 Sulfuric acid 49.85%
Equipment:
 Stirring hot plates
 Balances
 Stirring magnet
 pH-meter
 Turbidimeter
 Spectrophotometer with 1 cm optical path length cuvette.

The carmine solutions were prepared under stirring at max 50° C.

Solution of Carmine Lake

| Carmine lake 60% | 25.6% |
|---|---|
| Sodium hydroxide 97% | 2.5% |
| Propylene glycol | 35.5% |
| Tap water | 35.6% |
| Sulfuric acid 49.85% | 0.8% |

The NaOH was dissolved in 90% of the total amount of water.

Carmine lake was added into alkaline solution in order to have complete solubilization of the carmine lake and the pH was adjusted to between 10.8<pH<11.1.

90% of the total amount of propylene glycol was added and the solution was stirred for 30 min.

Stirring was decreased slowly (to avoid any precipitation) and the pH was adjusted to between 9.2<pH<9.8 with sulphuric acid diluted in the 10% left of water.

The carminic acid concentration was checked and adjusted if needed with the 10% left of propylene glycol.

Dispersion of Carmine Lake

|  |  |
|---|---|
| Carmine lake 60% | 25.6% |
| Sodium hydroxide 97% | 1.5% |
| Propylene glycol | 47% |
| Tap water | 25.9% |

NaOH was dissolved in 90% of the total amount of water.

Carmine lake was added into alkaline solution in order to have a complete dispersion of the carmine lake and the pH was adjusted to between 9.2<pH<9.5.

90% of the total amount of propylene glycol was added and the solution was stirred for 30 min.

The carminic acid concentration was checked and adjusted if needed with the 10% left of propylene glycol.

Carmine Blend

Two ratios were blended by strong stirring for min. 2 hours at a temperature below 50° C. according to the following scheme:

|  | Carmine blend 1 | Carmine blend 2 |
|---|---|---|
| Dispersion of carmine lake | 25% | 50% |
| Solution of carmine lake | 75% | 50% |

The percentage of carminic acid was determined by a method known to the skilled person and described in "Carmine" by FAO/WHO (JECFA) at the 55$^{th}$ JECFA (2000) and published in FNP 52 Add 8 (2000).

Example 2

Preparation of a Strawberry Fruit Preparation with Fruit Pieces

Ingredients (‰):

|  |  |
|---|---|
| Strawberry | 550 |
| Sugar | 300 |
| Isoglucose[1] | 45 |
| Starch[2] | 10 |
| Pectin[3] | 2.5 |
| Locust bean gum[4] | 2 |
| Citric acid | 0.1 |
| Sodium citrate | 0.85 |
| Potassium sorbate | 1 |
| Water | 88.55 |

[1]Isosweet ® 671 (Tate & Lyle),
[2]CR 2020 ® (Roquette),
[3]Unipectine ® 605C (Cargill distributed by Arles)
[4]Viscogum ® FA (Cargill distributed by Arles)

A Minimum of 6 kg Strawberry Fruit Preparation with Fruit Pieces was Made:

The frozen strawberries were put in a Stephan® Cooking Mixer.

The mixing baffle was used during all the process.

The strawberries were heated to 20° C. and the fruits were cut with knifes for a few seconds.

Water isoglucose and ⅔ of the sugar pre-heated (liquid blend) were added and heated to 40° C.

Citric acid, sodium citrate, the remaining sugar properly blended with the starch, the pectin and the locust bean gum were added and heated to 90° C.

The temperature was maintained for 1 min.

Color (or no color if FP is used later for screening) was added, then preservative and the temperature was maintained for 5 min while verifying that pH was 3.8±0.1 (correct if necessary) and brix was 39°±2.

The FP is cooled down to 25-30° C. in the Stephan.

After cooling, pH and brix (pH=3.8±0.1, brix=39±2) were checked again. The pH can be adjusted with sodium citrate or citric acid.

Example 3

Heat Stability Tested in Yoghurt with Fruit Preparation

The heat stability of the carmine blend was tested in a yoghurt with the strawberry fruit preparation with fruit pieces:

Materials:

Spectrocolorimeter: SPECTRAFLASH SF 450 (Datacolor) LAV opening (calibrated to a white tile)

Caps bottles heat resistant (capacity ~150 ml)

Aseptic cups (capacity ~150 ml)

Iwaki Petri boxes (diameter 35 mm)

Induction plate, pressure cooker and thermometer

Fruit preparation (FP; strawberry fruit preparation with fruit pieces according to Example 2 herein)

White mass (WM; purchased in supermarket, as standard stirred yogurt 3.5% fat content)

Method:

The colors were added directly into the FP.

The FP was blended into the WM at the ratio 15% (w/w) of FP in WM and stored for 30 min at 5° C. for color stabilization in the blend.

The colored blend was poured into small transparent Iwaki Petri boxes (diameter 35 mm). The color was evaluated by spectrocolorimetric measurements on the Petri boxes. This sample was the sample without heat treatment (w/o HT).

The uncolored FP was poured in blue cap bottles containing 100 mg of product and heated in a pressure cooker containing water on induction plate. When the FP reached 75° C., the cooker was closed and heated under pressure during for 10 min. (so that the temperature of FP reached 90° C.). The cap bottles were then placed into a hot water bath (minimum 90° C.) and opened carefully.

The colors were added into the warm FP at the determined dosage.

The bottles were closed again and maintained 5 min at 90° C. in the water bath.

The FP was cooled down quickly by placing the bottles in an iced water bath for approximately 1 hour.

The cold FP was blended into the WM at the ratio 15% (w/w) of FP in WM and stored 30 min at 5° C. for color stabilization in the blend.

The colored FP/WM was poured into small transparent Iwaki Petri boxes (diameter 35 mm). The blend of FP/WM was sieved before measuring in a 1 mm mesh sieve. The color was evaluated by spectrocolorimetric measurements on the Petri boxes.

This sample was the sample with heat treatment (with HT).

The spectrocolorimetric values were compared to spectrocolorimetric values of the samples without heat treatment.

The color was also evaluated visually.

Results:

TABLE 2

Carmine Standard (CA 4 LWK) as well as Carmine blend 1 (ratio of water dispersible:water soluble = 25:75) and Carmine blend 2 (ratio of water dispersible:water soluble = 50:50) were used for coloring Strawberry with fruit pieces fruit preparation.

| Sample | Pigment content % | Dosage in FP % | Carminic acid in FP ppm | L* | C* | h* | De* 2000 | Comments |
|---|---|---|---|---|---|---|---|---|
| Standard w/o HT | 4 | 0.45 | 180 | 75.87 | 18.44 | 8.54 | | |
| Standard with HT | 4 | 0.45 | 180 | 77.27 | 14.94 | 20.98 | 3.87 | Control |
| Carmine blend 1 w/o HT | 15 | 0.096 | 144 | 76.72 | 16.85 | 12.03 | | |
| Carmine blend 1 with HT | 15 | 0.096 | 144 | 77.70 | 14.25 | 21.93 | 2.99 | Better stability than target |
| Carmine blend 2 w/o HT | 15 | 0.096 | 144 | 77.29 | 15.55 | 14.55 | | |
| Carmine blend 2 with HT | 15 | 0.096 | 144 | 77.87 | 13.67 | 22.46 | 2.27 | Much better stability than target |

The L, C and h values are spectrocolorimetric values, measured in the yoghurt containing 15% of fruit preparation (FP) with the relevant color composition and 85% white mass. L, C and h characterize the overall color of the yoghurt. L* is the intensity, C* is the brightness and h* is the hue. DE*2000 is a global value giving the difference of overall color (L* + C* + h*) between two samples. Here DE*2000 was calculated to compare the overall color between the sample with fruit preparation without heat treatment (w/o HT) and fruit preparation with heat treatment (with HT).

Conclusion:
The 50:50 ratio of carmine dispersion to dissolved carmine (carmine blend 1) is the more stable (Lower DE*2000) but the presence of 50% of dispersion solution gives a less bright color compared to the control (lower C than for the Standard) (Table 2).
The 25:75 ratio of carmine dispersion to dissolved carmine (carmine blend 2) is more stable than the control but less stable than the 50:50 ratio (carmine blend 1). The brightness C is closer to the control than for the 50:50 ratio (carmine blend 1) (Table 2).
Both ratios gave good coloration of fruit pieces (Data not shown).

Example 4

Determination of the Improvement of Heat Stability

Materials and Method:
As in Example 3.
Results:

TABLE 3

Spectrocolorimetric values for yoghurt comprising fruit preparation colored with standard carmine reference (CA 4 LWK) or Carmine blend 1 according to the present invention before and after pasteurization. The yoghurt was made up of 15% fruit preparation and 85% white mass (standard stirred yoghurt with 3.5% fat content).

| Sample | Dosage in yoghurt % | Carminic acid in yoghurt ppm | Pasteurization | L* | C* | h* | Comments |
|---|---|---|---|---|---|---|---|
| CA 4 LWK | 0.0675% | 27 ppm | Before | 74.29 | 17.83 | 8.44 | |
| | | | After | 76.21 | 13.78 | 22.09 | Control |
| Carmine blend 1 | 0.018% | 27 ppm | Before | 73.95 | 19.17 | 8.00 | |
| | | | After | 75.43 | 14.91 | 17.53 | More blue |
| Carmine blend 1 | 0.0144% | 21.6 ppm | Before | 74.45 | 18.50 | 9.69 | |
| | | | After | 75.61 | 14.87 | 19.28 | Same shade |

Heat Stability Improvement:

The carmine composition according to the present invention (carmine blend 1) is less affected by the heat treatment than the standard carmine. Table 3 shows that after the heat treatment the carmine blend, added at the same amount of pigment than the target in the final application, is more intense (higher L*), brighter (higher C*), bluer (lower h*). When reducing the amount of pigment in the final application with 20%, the carmine blend presents the same spectrocolorimetric values as the target with standard carmine. This means that the carmine blend is 20% more heat stable than the standard carmine.

Figure 2:
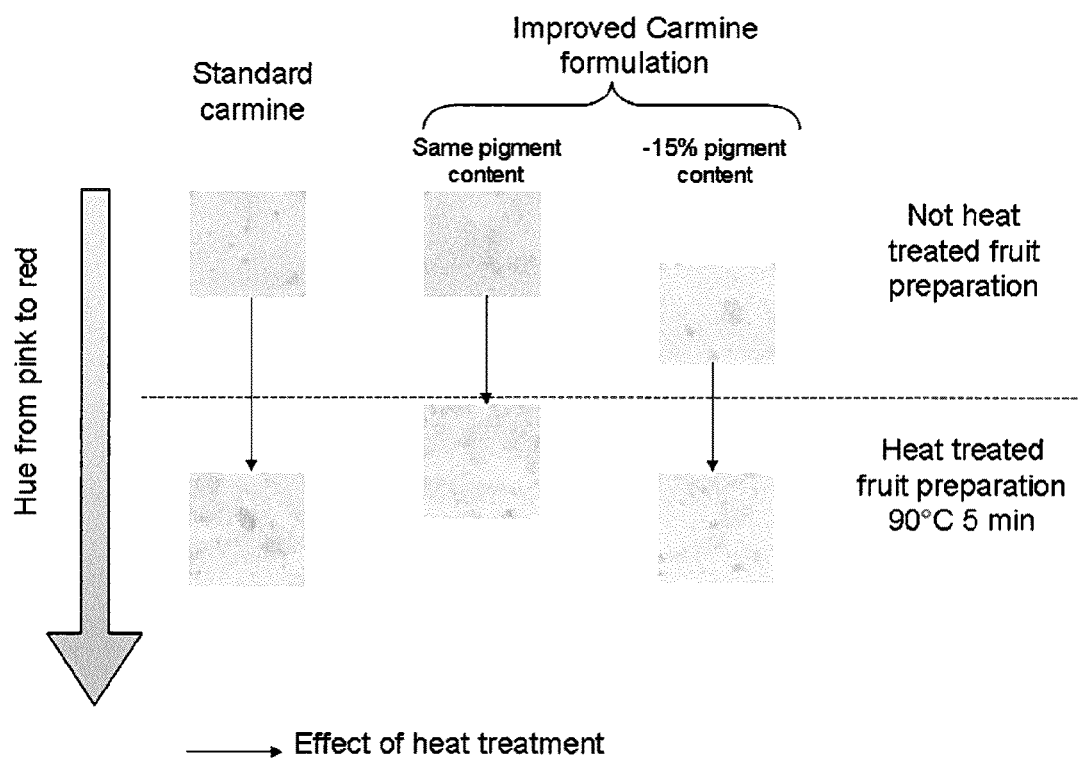
FIG. 2 illustrates the effect on h* values of heat treatment for 5 min. at 90° C. of fruit preparations colored with standard carmine reference (CA 4 LWK) or a carmine composition according to the present invention (Carmine blend), respectively.

FIG. 2 illustrates the concept of the carmine composition according to the present invention (carmine blend 1). The standard carmine (CA 4 LWK) changes shade form the top to the bottom of the scale in the left when it is affected by the heat treatment. The change of shade of carmine blend 1 is smaller; therefore it is possible to add 20% less pigment to achieve the same shade as the standard carmine after the heat treatment.

The carmine solution that the inventors of the present invention has developed:
- contains high pigment strength (15% pigment) allowing cost improvements and low environmental impact,
- is of low viscosity despite the presence of solid particles, the dispersion of these particles in a liquid solution, and the high amount of pigment in the solution,
- presents a shade similar to that of the standard carmine colorants in the European and US market.

Example 5

Determination of the Ratio of Dispersed Carmine Lake to Dissolved Carmine Lake in a Carmine Food Coloring Composition According to the Present Invention An alternative and simpler way for determining the ratio of dispersed carmine lake to dissolved carmine lake involves the use of turbidity measurements.

As the dissolved carmine lake fraction does not have any turbidity, it is the quantity of carmine lake which is in dispersed form that is quantitated.

For ex. a ratio of 25:75 refers to 25% of the overall amount of pigment being in a dispersed form in the blend.

Measurement of the Percentage of Carminic Acid

First, the carminic acid dosage in the blend is determined in order to have the same quantity of pigment every time for the turbidity measurement.

The percentage of carminic acid (dosage) in the blend can be determined by a method known to the skilled person and described in "Carmine" by FAO/WHO (JECFA) at the 55th JECFA (2000) and published in FNP 52 Add 8 (2000).

Turbidity Measurement on a Set Quantity of Pigment

The turbidity measurement is performed with a nephelometer and expressed in Nephelometric Turbidity Units (NTU).

A standard table at 0.075 mg/ml carmine lake was prepared by measuring the turbidity of different blends of water dispersible carmine lake and water soluble carmine lake in ratios of 100:0, 75:25, 50:50, 25:75 and 0:100) with a carminic acid quantity of 7.5 mg of pure carmine into 100 mL of water (Table 4).

TABLE 4

The turbidity measured as NTU for different blends of water dispersible carmine lake and water soluble carmine lake with a carminic acid concentration of 0.075 mg/mL

| Water dispersible | Water soluble | NTU | Comment |
| --- | --- | --- | --- |
| 100% | 0% | 350-450 | 0.075 mg/mL carmine lake in dispersed form |
| 75% | 25% | 250-350 | 0.056 mg/mL carmine lake in dispersed form |
| 50% | 50% | 150-250 | 0.038 mg/mL carmine lake in dispersed form |
| 25% | 75% | 50-150 | 0.019 mg/mL carmine lake in dispersed form |
| 0% | 100% | <10 | 0 mg carmine lake in dispersed form |

Determination of the Ratio of Water Dispersible to Water Soluble Carmine Lake in a Blend.

In order to determine the percentage of water dispersible carmine lake in the blend a turbidity measurement is made on a sample with the equivalent to 7.5 mg of pure carmine with water added to 100 mL.

For example, if the carminic acid dosage was determined to be 15%, (7.5/0.15) 50 mg of the blend is added water up to 100 mL. For a more concentrated product with, for example, a carminic acid dosage of 50% we add (7.5/0.5) 15 mg of the blend into 100 mL and for a less concentrated product with, for example, a carminic acid dosage of 5% we add (7.5/0.05) 150 mg of the blend into 100 mL.

The described method will also work for blends of water dispersible carmine and water soluble carmine with different dosages. If, for example, the blend is with 25% of a water dispersible carmine of 5% of carminic acid and 75% of water soluble product of 15% of carminic acid, the blend will have a dosage of 12.5% of carminic acid and the ratio will be 10:90 of water dispersible pigment to water soluble pigment. A solution of (7.5/0.125) 60 mg of the blend added water to 100 mL has a turbidity close to 10-50 NTU.

REFERENCES

WO2006/056585

The invention claimed is:

1. A carmine food coloring composition comprising a dispersion of carmine lake and a solution of carmine lake in a ratio of from about 5:95 to about 50:50 of dispersed carmine lake to dissolved carmine lake.

2. The carmine food coloring composition according to claim 1, wherein the ratio is from about 15:85 to about 40:60 of dispersed carmine lake to dissolved carmine lake.

3. The carmine food coloring composition according to claim 2, wherein the ratio is from about 20:80 to about 30:70 of dispersed carmine lake to dissolved carmine lake.

4. The carmine food coloring composition according to claim 1, wherein the solution of carmine lake comprises an excipient.

5. The carmine food coloring composition according to claim 4, wherein the excipient is propylene glycol.

6. The carmine food coloring composition according to claim 4, wherein the excipient is present in an amount of from about 30% (w/w) to about 50% (w/w) of the carmine food coloring composition.

7. The carmine food coloring composition according to claim 1, wherein the carmine pigment content comprises at least 13% (w/w) of the carmine food coloring composition.

8. A method for coloring a foodstuff comprising adding the carmine food coloring composition according to claim 1 to a foodstuff.

9. The method according to claim 8, wherein the foodstuff is a fruit preparation.

10. The method according to claim 8, wherein the foodstuff is a dairy product.

11. A method for preparing a carmine food coloring composition comprising:
   (a) preparing a dispersion of carmine lake in an aqueous solution having a pH less than 10.6,
   (b) separately preparing an alkaline solution of dissolved carmine lake by dissolving carmine lake in an aqueous solution having a pH greater than 10.6, adding an excipient to the solution, and slowly adjusting the pH of the solution to a pH greater than 9.2 and less than 9.9, and
   (c) blending the dispersion of carmine lake with the alkaline solution of dissolved carmine lake in a ratio of from about 5:95 to about 50:50 dispersed carmine lake to dissolved carmine lake.

12. The method according to claim 11, wherein in step (c) the ratio is from about 15:85 to 40:60 of dispersed carmine lake to dissolved carmine lake.

13. The method according to claim 11, wherein in step (c) the ratio is from about 20:80 to about 30:70 of dispersed carmine lake to dissolved carmine lake.

14. A carmine food coloring composition obtained by the method claim 11.

15. The method according to claim 11, wherein the dispersion of carmine lake is prepared in an aqueous solution having a pH greater than 9.2 and less than 9.8.

\* \* \* \* \*